D. A. WOODWARD.
Solar-Camera Attachments.
No. 151,462. Patented May 26, 1874.
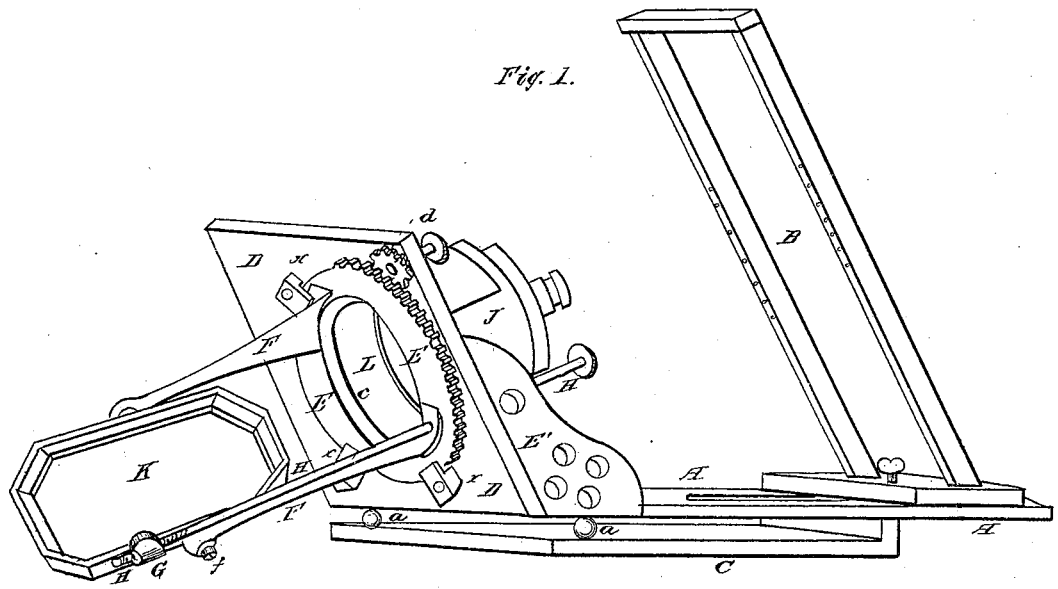

UNITED STATES PATENT OFFICE.

DAVID A. WOODWARD, OF BALTIMORE, MARYLAND.

IMPROVEMENT IN SOLAR-CAMERA ATTACHMENTS.

Specification forming part of Letters Patent No. 151,462, dated May 26, 1874; application filed April 2, 1874.

*To all whom it may concern:*

Be it known that I, DAVID A. WOODWARD, of Baltimore, in the county of Baltimore and State of Maryland, have invented certain new and useful Improvements in Solar Cameras; and I do hereby declare that the following is a full, clear, and exact description thereof, which will enable others skilled in the art to which it pertains to make and use the same, reference being had to the accompanying drawings, and to the letters of reference marked thereon, which form a part of this specification.

The object of my invention is to construct a solar-camera attachment which will insure the undisturbed relative position of its parts during its operation, which results in more perfect photographs when enlarged from smaller negatives; and to this end the nature of my invention consists in the combination, with a horizontal table, of an inclined adjustable easel, for holding the sensitive paper, and an inclined plate, permanently attached to the table parallel with the easel, and to which the camera is attached. Also, in the construction of said inclined plate. My invention also consists in the devices for regulating or adjusting the reflector; and also in the devices whereby the reflector is held so that strong winds will not affect it or change its position, all of which will be hereinafter more fully set forth.

In the accompanying drawing, Figure 1 is a perspective view of my improved solar-camera. Fig. 2 represents the reflector, showing its connection with the arms supporting it; and Fig. 3 is a view of the inclined plate.

A represents a horizontal table of any suitable dimensions, upon one end of which is supported an inclined easel, B, for holding the sensitive paper. The easel B is held to the table A by means of a set-screw, b, and is adjusted back and forth on the table by loosening the set-screw, and sliding the same in a central longitudinal slot on the table, the easel, however, always retaining the same angle or inclination. The table A is intended to rest on a horizontal platform, C, fastened to the window-sill, so that the camera containing the negative and the sensitive paper may be readily drawn to and from the window without disturbing their relative positions to each other. To facilitate the movement with large-sized solar cameras, casters or rollers $a$ may be fixed to the bottom of the table A.

By the slot in the table A and the set-screw $b$ the easel may be moved to and from the object-lens of the camera, and firmly fixed at any point.

At the other end of the table A is attached a plate, D, of metal or other suitable material, having brackets E', by which it is secured firmly to the table in an inclined position, and parallel to the easel B. To this plate D the camera and reflector are both connected.

The object of the inclination of the plate D is to render practicable the use of a much smaller reflector and frame than would be the case were the plate D and easel B made perpendicular to the table A, as the direct rays of the sun are received much more obliquely to the axis of the condensing-lens; consequently, a comparatively short mirror, K, is required to reflect the rays perpendicular to the axis of the condensing-lens. Also, by thus reducing the length of the reflector, a much less surface is exposed to the effect of high winds when the apparatus is in operation, and, by inclining the camera at the same time, the possibility of the direct rays of the sun striking the condenser at a season of the year when the sun is low is effectually prevented. It also materially reduces the cost of the camera.

In the center of the plate D is a circular opening, L, corresponding in size to the diameter of the condensing-lens to be employed; and around this opening, on the inner side of the plate, is a circular flange, $c$, for supporting the drum or cylinder of the camera. On the outer side of the plate D, in suitable bearings $x$ $x$, is placed a toothed wheel, E, surrounding the opening L, said wheel gearing with a pinion, $d$, by which it can be revolved from the inside. Extending from the toothed wheel E, perpendicular to its inclined surface, are two arms, F, which at their extremities embrace the frame of the reflector on both sides or edges at about its center, or at a point where it will be nearly, if not quite, balanced. At the ends of the arms F are eyes $e$, through which screw-pivots $f$ pass, and enter a boss, $g$, formed on the edges of the reflector-frame.

By screwing up the screws *f* tightly, the arms F are drawn tightly to the bosses *g* of the frame, rendering any movement of the reflector from the wind impossible. At a short distance from the pivoted axis, and toward the outer end of the reflector, is attached a swiveled or swinging nut, G, to the edge of the frame, through which nut passes one end of an adjustable screw-rod, H, the other end passing through an opening in the toothed wheel E, and thence through a slot, *y*, in the plate D, partly encompassing the circular opening L in the same, by which the position of the reflector may be changed to any angle required, although held so tight by the screw-pivots *f*, causing the arms F to bear on the boss *g* of the frame, as to be unaffected by strong winds. Over the flange *c*, encircling the opening L in the plate D, is placed a drum or cylinder, J, of sheet metal or other suitable material, for containing the condensing-lens and adjustable negative-holder. The other end of this drum is closed and carries the objective lens.

Having thus fully described my invention, what I claim as new, and desire to secure by Letters Patent, is—

1. The combination, with a solar camera, of a horizontal table, A, a plate, D, permanently attached thereto in an inclined position, for holding the camera, and an adjustable easel, B, held at any distance desired from the camera at an inclination parallel to that of the plate D, substantially as and for the purposes herein set forth.

2. The plate D, provided with the brackets E' E', central opening L, circular flange *c*, and slot *y*, and permanently attached in an inclined position to a horizontal table, A, substantially as and for the purposes herein set forth.

3. The combination of the inclined plate D, toothed wheel or ring E, pinion *d*, arms F F, reflector K, nut G, and adjustable screw-rod H, all constructed and arranged substantially as and for the purposes herein set forth.

4. The bosses *g*, formed upon the outside edges of the reflector-frame K, in combination with the arms F F, adjusting screw-rod H, and screw-pivots *f f*, substantially as and for the purposes herein set forth.

5. In combination with the flange *c* of the plate D, the drum or cylinder J, all substantially as and for the purpose herein specified.

In testimony that I claim the foregoing as my own I affix my signature in presence of two witnesses.

DAVID A. WOODWARD.

Witnesses:
C. H. WATSON,
FRED. T. HERDER.